Feb. 6, 1968 M. MILLER 3,367,357
IRRIGATION PIPE COUPLER SHOE AND CONNECTOR
Filed Oct. 22, 1965
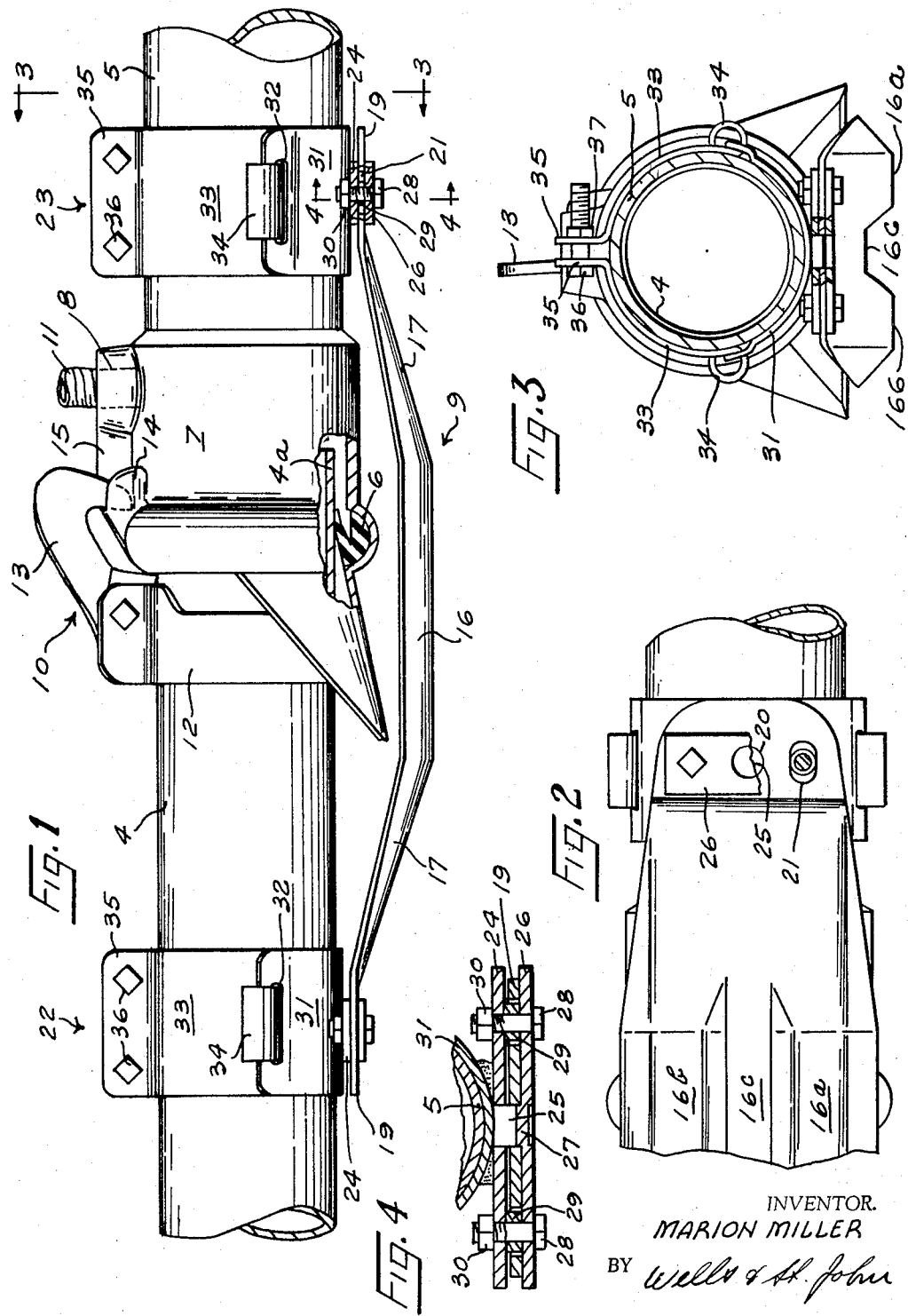
INVENTOR.
MARION MILLER
BY Wells & St. John
ATTYS.

United States Patent Office 3,367,357
Patented Feb. 6, 1968

3,367,357
IRRIGATION PIPE COUPLER SHOE
AND CONNECTOR
Marion Miller, Spokane, Wash., assignor to Anderson-Miller Manufacturing Company, Spokane, Wash., a corporation of Washington
Filed Oct. 22, 1965, Ser. No. 500,773
4 Claims. (Cl. 137—344)

This invention relates to couplings for irrigation pipe. The sections of irrigation pipe are moved frequently by pulling the coupled sections endwise. In such cases it is desirable to have a shoe or runner beneath the coupling which will support the coupling and yet allow for a limited amount of lateral movement of one pipe with respect to the other at the coupling.

It is the purpose of this invention to provide a novel shoe construction with clamps at its ends that clamp to pipe sections at a short distance beyond the connection between them, the clamps connecting to the shoe in such a manner that the pipe sections can swing in a horizontal direction a limited amount and yet retain the coupling joint free of strain.

It is also the purpose of this invention to provide in combination a shoe which connects to and supports two pipe sections at their joint for limited lateral movement and an oppositely disposed latch over the joint cooperating to transmit the pulling force from one pipe section to the other when the pipe is pulled endwise.

Other and more specific objects and advantages of the invention will appear from the following description and the accompanying drawings illustrating a preferred form of the invention. The drawings and description are intended to be descriptive of the preferred form, however, and are not intended to limit the invention to the exact details shown and described. Changes may be made within the scope of the appended claims.

In the drawings:
FIGURE 1 is a view in side elevation of an irrigation pipe coupler and shoe embodying my invention with certain parts broken away to illustrate the interior structure;
FIGURE 2 is a partial bottom plan view with parts broken away of the device;
FIGURE 3 is a sectional view on the line 3—3 of FIGURE 1; and
FIGURE 4 is an enlarged sectional view on the line 4—4 of FIGURE 1.

Referring now in detail to the drawings the invention is shown in connection with two pipe sections 4 and 5. The section 4 is terminated at 4a as a plain open end which fits into a sealing ring 6 of rubber that is seated within a coupler head 7 on the pipe section 5. The pipe section 5 may be a short unit having a second head like 7 at its other end to receive a plain end of another long pipe section like the section 4. The head 7 may have a top aperture at 8 threaded to receive a sprinkler head riser 11.

According to the present invention the two pipe sections 4 and 5 are coupled together so they may be pulled endwise in either direction by a shoe 9 and a latch 10 opposite the shoe 9. The shoe 9 serves as a support for the joint between the two sections to hold this joint above the ground and keep it in position to have the riser 11 pointed upward. The quick coupler latch 10 is composed of a clamp 12 that is clamped to the pipe section 4, a hook 13, and raised ribs 14 and 15 on the head 7 that provide a recess into which the hook 13 fits.

The shoe 9 includes a heavy metal plate which has its intermediate portion 16 provided with longitudinally running ribs 16a and 16b and a channel 16c between them. The plate has end portions 17 which slope upward from the portion 16 and flatten out to provide mounting portions 19 which are identical. Each mounting portion has a central circular aperture 20 and two elongated apertures 21 transversely spaced from the aperture 20. One of the mounting portions 19 is secured to the pipe section 4 by a clamp 22 and the other portion 19 is secured to the pipe section 5 by a clamp 23. The means of securing the portions 19 to their respective clamps 22 and 23 are the same. Each clamp has a cross bar 24 rigidly secured thereto. At the center of this cross bar there is a stub shaft 25 which projects downward into the aperture 20 of the mounting portion 19 on the shoe 9, and provides a pivot on which the portion 19 can turn. A second cross bar 26 is located beneath the mounting portion 19 and has a raised central portion 27 which abuts the lower end of the stub shaft 25 and is of the same diameter as the stub shaft 25. Bolts 28 have spacer ring 29 around them within the elongated apertures 21 and extend through the cross bars 24 and 26. Nuts 30 are threaded on the bolts 28 and serve with the bolts to clamp the two cross bars 24 and 26 to each other and leave the mounting portion 19 free to turn on the stub shaft 25 without binding. The limits of turning are determined by the elongated apertures 21.

The clamps 22 and 23 are three piece units. Each clamp has a lower arcuate section 31 which has its ends offset outward and slotted at 32. Two upper clamp sections 33 have tongues 34 extending through the slots 32 and bent around to form hinges. The upper ends of the sections 33 are formed to provide spaced parallel flanges 35 which are drawn together by bolts 36 and nuts 37 to secure the clamp to its pipe section.

The construction just described provides a means for connecting and supporting the joints between lengths of irrigation pipe so that the sections have angular movement enough with respect to each other so that they may be pulled endwise out of one sprinkling position in a field and into the next sprinkling position spaced transversely of the pipe while the sections remain coupled together. The pulling force between pipe sections is through the shoes 9 at the bottom and the latch 10 at the top. The shoes with their ribbed central portions 16 guide the pipe sections and keep the sprinkler risers upright.

It is believed that the nature and advantages of this invention will be clear from the foregoing description.

I claim:
1. Means for supporting and guiding irrigation pipe at the joints between pipe sections comprising:
   a clamp on each pipe section;
   a shoe extending beneath the sections and clamps from one clamp to the other;
   means pivotally connecting the shoe to each clamp for limited angular movement in a horizontal direction with respect to the pipe section on which the clamp is located; and
   latch means on top of the pipe sections at the joint cooperating with said shoe to transfer pull forces from one pipe section to the other;
   said shoe having an intermediate ground engaging portion with upwardly sloping ends leading to the means pivotally connecting the shoe to the clamp.
2. The device defined in claim 1 wherein the shoe has guide ribs on said intermediate portion extending lengthwise thereof adjacent to its side edges.
3. The device defined in claim 1 wherein the means pivotally connecting the shoe to each clamp comprises spaced bars on the clamp having a central stub shaft and bolts spaced from the stub shaft;

a mounting portion on the shoe between said bars having a central circular aperture receiving the stub shaft and having elongated apertures spaced from the central aperture receiving the bolts;

and spacers around the bolts maintaining the bars spaced apart a distance greater than the thickness of the mounting portion.

4. A shoe assembly attachable to irrigation pipe sections at the joints therebetween for supporting and guiding the sections comprising:

an elongated shoe having an intermediate ground engaging portion and end portions sloping upward from said intermediate portion and terminating in mounting portions which are substantially parallel to the intermediate portion;

a pipe clamp attached to each mounting portion for limited angular movement relative to the shoe;

means connecting the clamp to the mounting portion comprising a bar on the clamp having a stub shaft thereon;

the mounting portion having an aperture receiving the shaft; and means to hold the mounting portion on the stub shaft.

References Cited

UNITED STATES PATENTS

| | | | |
|---|---|---|---|
| 2,469,538 | 5/1949 | Young | 285—5 XR |
| 2,494,854 | 1/1950 | Anderson | 285—5 XR |
| 2,508,716 | 5/1950 | Hauf | 285—5 |
| 2,834,634 | 5/1958 | Johnson | 239—213 XR |
| 2,860,008 | 11/1958 | Jacoby | 285—5 XR |
| 3,259,319 | 7/1966 | Wallace | 239—212 XR |
| 3,295,548 | 1/1967 | Woods | 285—5 XR |
| 3,324,876 | 6/1967 | Morgan | 137—344 |

M. CARY NELSON, *Primary Examiner.*

S. SCOTT, *Assistant Examiner.*